United States Patent
Constantin et al.

[11] 3,712,341
[45] Jan. 23, 1973

[54] ANTICAVITATION DEVICE

[75] Inventors: Jean-Pierre Constantin, Grenoble; Jean-Claude Duquesne; Michel Pontier, both of Aix en Provence, all of France

[73] Assignee: Commissariat A L'Energie Atomique, Paris, France

[22] Filed: Jan. 19, 1971

[21] Appl. No.: 107,744

[30] Foreign Application Priority Data

Feb. 13, 1970 France...................................7005271

[52] U.S. Cl.................................................138/44
[51] Int. Cl................................................F15d 1/06
[58] Field of Search......................138/39, 40, 44

[56] References Cited

UNITED STATES PATENTS

| 1,298,471 | 3/1919 | Dodge | 138/44 X |
| 1,419,876 | 6/1922 | Mefelsden et al. | 138/44 |
| 1,802,766 | 4/1931 | Kerr | 138/44 |

*Primary Examiner*—Herbert F. Ross
*Attorney*—Cameron, Kerkam & Sutton

[57] ABSTRACT

A flow separator is placed along the axis of a vertical duct and has a radial enlargement which is in contact with the internal duct wall. The duct is thus separated into a lower region and an upper region in which are located orifices for the admission of liquid under pressure. The radial enlargement is provided with an upward tubular extension which is so shaped internally as to form a highly progressive convergent-divergent nozzle while defining externally with the duct wall an annular space having at least one section which is partially throttled by a transverse diaphragm, said diaphragm being rigidly fixed to said tubular extension.

2 Claims, 1 Drawing Figure

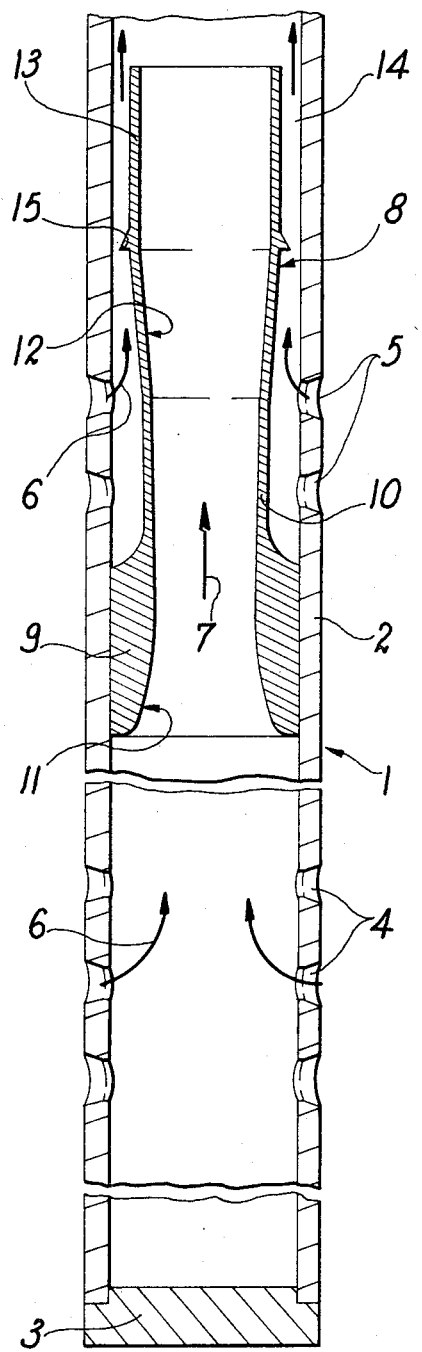

ANTICAVITATION DEVICE

This invention relates to a device for limiting and if necessary even eliminating the phenomenon of cavitation within a duct which is supplied with a liquid under pressure through orifices formed in different regions in the lateral surface of said duct, the jets of liquid which are derived from said orifices being liable to induce turbulences in the flow regime in the zones in which said jets meet when provision is not made for the device under consideration.

The invention applies primarily although not exclusively to nuclear reactor fuel assemblies, especially fuel assemblies which are cooled by a liquid such as liquid sodium and which usually comprise a cylindrical end-fitting located in a vertical position during use within the reactor; the sodium passes into said end-fitting through lateral orifices which are disposed in a number of horizontal rows provided at different levels and undergoes an abrupt deviation substantially at right angles, then flows upwards in the direction of the fuel pins of the assembly which are mounted above the end-fitting. Said end-fitting plays the part of a mechanical support and also has a hydraulic function. Experience has shown that the phenomenon of cavitation in the coolant appears especially at the level of the upper orifices at the point of contact with the upward flow which comes from the lower orifices. As a result of this phenomenon, the assembly is liable to be attended by major disadvantages such as erosion of certain structures, production of high noise arising from resorption of bubbles produced within the liquid, thereby preventing the operation of acoustic devices for detecting sodium boiling and finally the possible presence of vibrations which are liable to cause damage to some parts of the assembly and to impair the mechanical strength of the structure as a whole.

The aim of this invention is to provide a device which overcomes the above-mentioned disadvantages, especially by preventing any contact between the jets of liquid which pass out of the upper orifices and the flow which is derived from the lower orifices.

To this end, said device essentially comprises a flow-separating component which is placed along the axis of the vertically disposed duct and has a radial enlargement which is in contact with the internal wall of the duct so as to separate said duct into a lower region and an upper region in which are located orifices for the admission of a liquid, said enlargement being provided with an axial extension in the upper region in the form of a tubular casing having internally the shape of a convergent-divergent nozzle with very progressive inlet and outlet profiles and defining externally with the duct wall an annular space having at least one section which is partially throttled by a transverse diaphragm, said diaphragm being rigidly fixed to said tubular casing.

As an advantageous feature and in a preferred embodiment of the invention, the tubular casing comprises a cylindrical extension having a wall which is parallel to the duct, the transverse diaphragm being placed at the point of junction of said casing and said extension.

Further properties of the anticavitation device considered will become apparent from the following description of one exemplified embodiment which is given by way of indication without any limitation being implied, reference being made to the single FIGURE of the accompanying drawings in which the extremity of a fuel-assembly end-fitting provided with a flow separator in accordance with the invention is illustrated diagrammatically in axial cross-section.

In this FIGURE, the reference numeral 1 generally designates the end-fitting of a fuel assembly for nuclear reactors and especially reactors of the so-called fast neutron type in which the core is cooled by a continuous circulation of liquid metal such as sodium. Said end-fitting 1 is provided in the form of a cylindrical duct having a vertical axis and constituted by a side wall 2 and an end-cap 3 which serves to close said wall at the lower extremity. The end-fitting 1 is open at the upper extremity and joined to the fuel assembly proper (not shown in the FIGURE) which contains in particular pin-type elements formed of suitable nuclear fuel material. In order to permit efficient cooling by means of the sodium which flows through the fuel assembly, the end-fitting 1 is provided with a series of radial orifices which are formed through the wall 2 and designated in the FIGURE by the reference numerals 4 and 5 according as said orifices are located at the bottom portion or top portion of the end-fitting. Said orifices 4 and 5 are preferably arranged in a number of superposed horizontal rows each consisting of a given number of orifices such as six in the embodiment which is shown by way of example in the FIGURE. The sodium under pressure which thus penetrates into the end-fitting after having passed through the above-mentioned orifices undergoes an abrupt deviation substantially at right angles as shown by the arrows 6, then flows upwards within the end-fitting in the direction of the fuel assembly as shown by the arrow 7.

The higher performances which are required from nuclear reactor fuel assemblies especially in order to obtain higher power levels, higher temperature levels and higher flow rates entail the need for higher rates of flow of the coolant sodium. In practice, this results in increased danger of cavitation, in particular at the level of the orifices which are formed in the upper portion or region of the end-fitting.

In order to prevent the appearance of this phenomenon, provision is made in accordance with the invention for a flow-separating component which is mounted within the interior of the fuel-assembly end-fitting and designated in the drawing by the reference numeral 8. Said flow-separating component is provided at one extremity with an enlargement 9 which serves to secure the flow separator to the internal surface of the end-fitting wall 2 and separates said end-fitting into an upper region and a lower region. The component 8 also has a tubular casing 10 which is provided internally with a flow cross-section having the shape of a convergent-divergent nozzle with very progressive profiles 11 and 12 respectively. At the end which is remote from the enlargement 9, the convergent-divergent portion 12 is joined to a cylindrical extension 13 which is coaxial with the wall 2. The assembly which is formed by the tubular casing 10 and the extension 13 defines an annular space 14 with the wall 2 and the sodium derived from the orifices 5 of the upper region flows into said space, the sodium stream being thus completely separated from the stream which flows from the orifices 4. The component 8 thus provides total separation between the streams derived from the orifices mentioned above while making it possible in particular to prevent said streams from coming into contact with each other and thus developing turbulences. Beyond the extension 13, the fluid jets are parallel and are mixed without giving rise to any cavitation phenomenon.

Moreover, in order to ensure substantially greater uniformity in the flow velocities of the fluid jets which are derived from the different orifices, the flow separator 8 is advantageously provided with a transverse diaphragm 15 within the annular space 14 at the point of junction of the divergent portion 12 and the extension 13. The design function of said diaphragm 15 is to produce an appreciable obstruction within said space 13 and to increase the gain which results from the separator itself.

It will have become quite clear from the foregoing that the invention is not limited to the exemplified embodiment as hereinabove described with reference to the accompanying FIGURE but extends to all alternative forms.

What we claim is:

1. An anticavitation device comprising a duct having a plurality of orifices for admitting a liquid under pressure into said duct, a flow-separating component having an annular enlargement circumferentially secured to the internal wall of the duct so as to separate said duct into a lower region and an upper region in which the orifices for the admission of the liquid are located, said enlargement having an axial extension in the upper region in the form of a tubular casing having internally the shape of a convergent-divergent nozzle with very progressive inlet and outlet profiles, said tubular casing defining an annular space with the duct wall and having a transverse diaphragm rigidly fixed to said tubular casing for throttling the flow in said annular space.

2. An anticavitation device according to claim 1, wherein the tubular casing includes a cylindrical extension having a wall which is parallel to the duct, the transverse diaphragm being placed at the point of junction of said casing and said cylindrical extension.

* * * * *